United States Patent [19]

Suzuki et al.

[11] Patent Number: 5,311,489
[45] Date of Patent: May 10, 1994

[54] OPTICAL HEAD FOR RECORDING, REPRODUCING, OR ERASING INFORMATION HAVING FIXED AND MOVABLE HEAD UNITS

[75] Inventors: Yasuo Suzuki, Tokyo; Nobuaki Date, Kawasaki, both of Japan

[73] Assignee: Canon Kabushiki Kaisha, Tokyo, Japan

[21] Appl. No.: 9,351

[22] Filed: Jan. 26, 1993

Related U.S. Application Data

[63] Continuation of Ser. No. 596,326, Oct. 12, 1990, abandoned.

[30] Foreign Application Priority Data

Oct. 13, 1989 [JP] Japan ............... 1-265115
Oct. 13, 1989 [JP] Japan ............... 1-265116
Dec. 13, 1989 [JP] Japan ............... 1-324349

[51] Int. Cl.$^5$ .............................. G11B 7/00
[52] U.S. Cl. ....................... 369/44.14; 369/44.11

[56] References Cited

U.S. PATENT DOCUMENTS

| | | | |
|---|---|---|---|
| 4,032,776 | 6/1977 | van Rosmalen | 369/44.15 |
| 4,959,824 | 9/1990 | Ueda et al. | 369/44.14 |
| 4,977,552 | 12/1990 | Gotoh | 369/44.14 |

FOREIGN PATENT DOCUMENTS

| | | | |
|---|---|---|---|
| 60-57546 | 4/1985 | Japan | 369/44.14 |
| 61-45426 | 3/1986 | Japan | 369/44.14 |
| 61-87229 | 5/1986 | Japan | 369/44.14 |
| 61-122947 | 6/1986 | Japan | 360/114 |
| 62-22246 | 1/1987 | Japan | 369/44.14 |
| 62-165739 | 7/1987 | Japan | 369/44.14 |
| 62-165743 | 7/1987 | Japan | 369/44.14 |
| 62-192936 | 8/1987 | Japan | 369/44.14 |
| 62-205534 | 9/1987 | Japan | 369/44.14 |
| 63-149839 | 6/1988 | Japan | 369/44.14 |
| 271437 | 3/1990 | Japan | 360/114 |

*Primary Examiner*—Howard W. Britton
*Assistant Examiner*—Thai Tran
*Attorney, Agent, or Firm*—Fitzpatrick, Cella, Harper & Scinto

[57] ABSTRACT

An optical head for recording, reproducing, or erasing information by projecting a light beam onto a disk-like recording medium. The optical head includes a fixed head unit having a light source for generating the light beam and a sensor for receiving light reflected from the disk-like recording medium which was generated by the light source and projected onto the disk-like recording medium. The head also includes a movable head unit movable in the radial direction of the disk-like recording medium toward the fixed head unit. The movable head unit has an objective lens for condensing the light beam generated by the light source and projecting the light beam generated by the light source and projecting the light beam onto the disk-like recording medium. The fixed head unit and movable head unit each include a wall having an optical path window therein positioned in the optical path between the first head unit and the movable head unit. Each wall also includes a portion surrounding the optical path window and projecting in the direction of the optical path between the fixed head unit and the movable head unit.

9 Claims, 9 Drawing Sheets

OPTICAL HEAD FOR RECORDING, REPRODUCING, OR ERASING INFORMATION HAVING FIXED AND MOVABLE HEAD UNITS

This application is a continuation of application Ser. No. 07/596,326 filed Oct. 12, 1990, now abandoned.

BACKGROUND OF THE INVENTION

1. Field of the Invention

The present invention relates to an optical head for use in an information recording and reproducing apparatus for optically recording, reproducing or erasing information on a recording medium, such as an optical disk, an optical magnetic disk or the like.

2. Description of Prior Art

Figure 1:
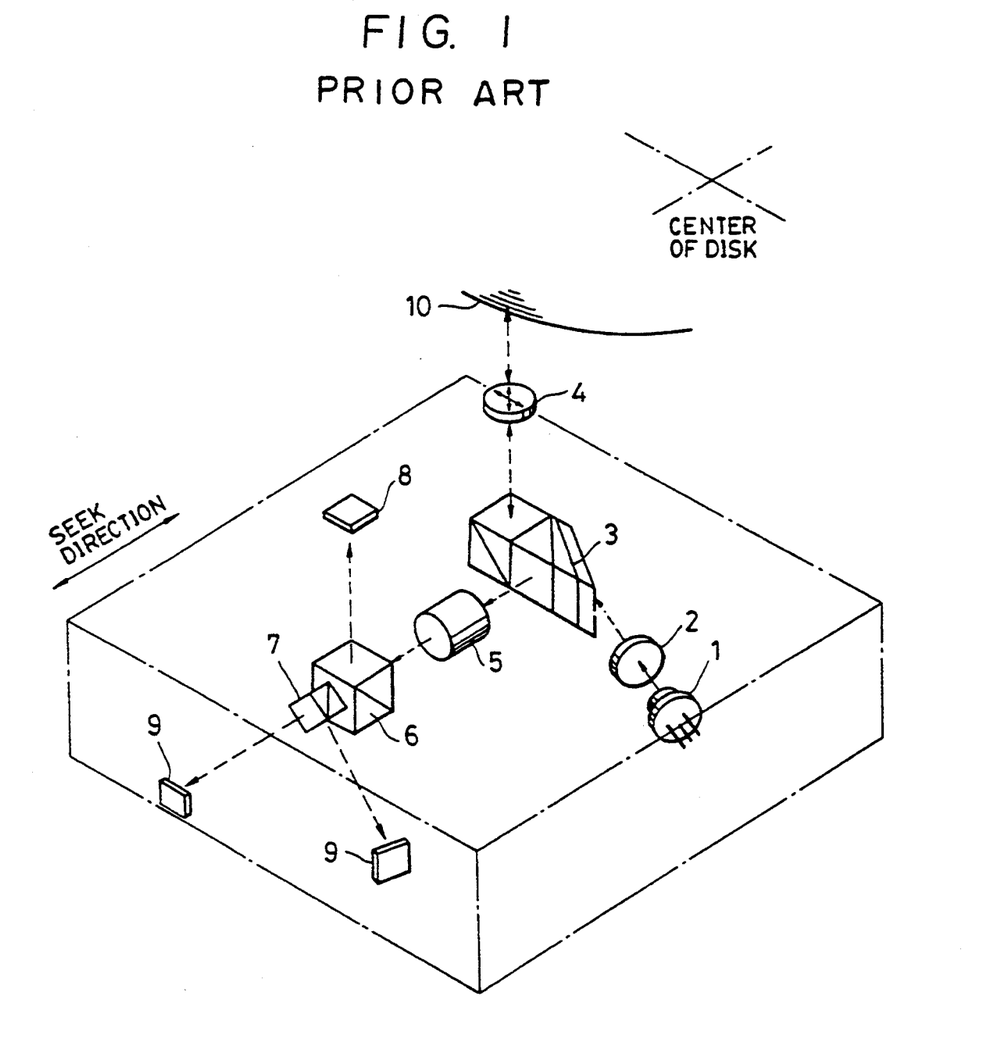
FIG. 1 is a view showing the composition of a conventional unit-type optical head.
Figure 2:
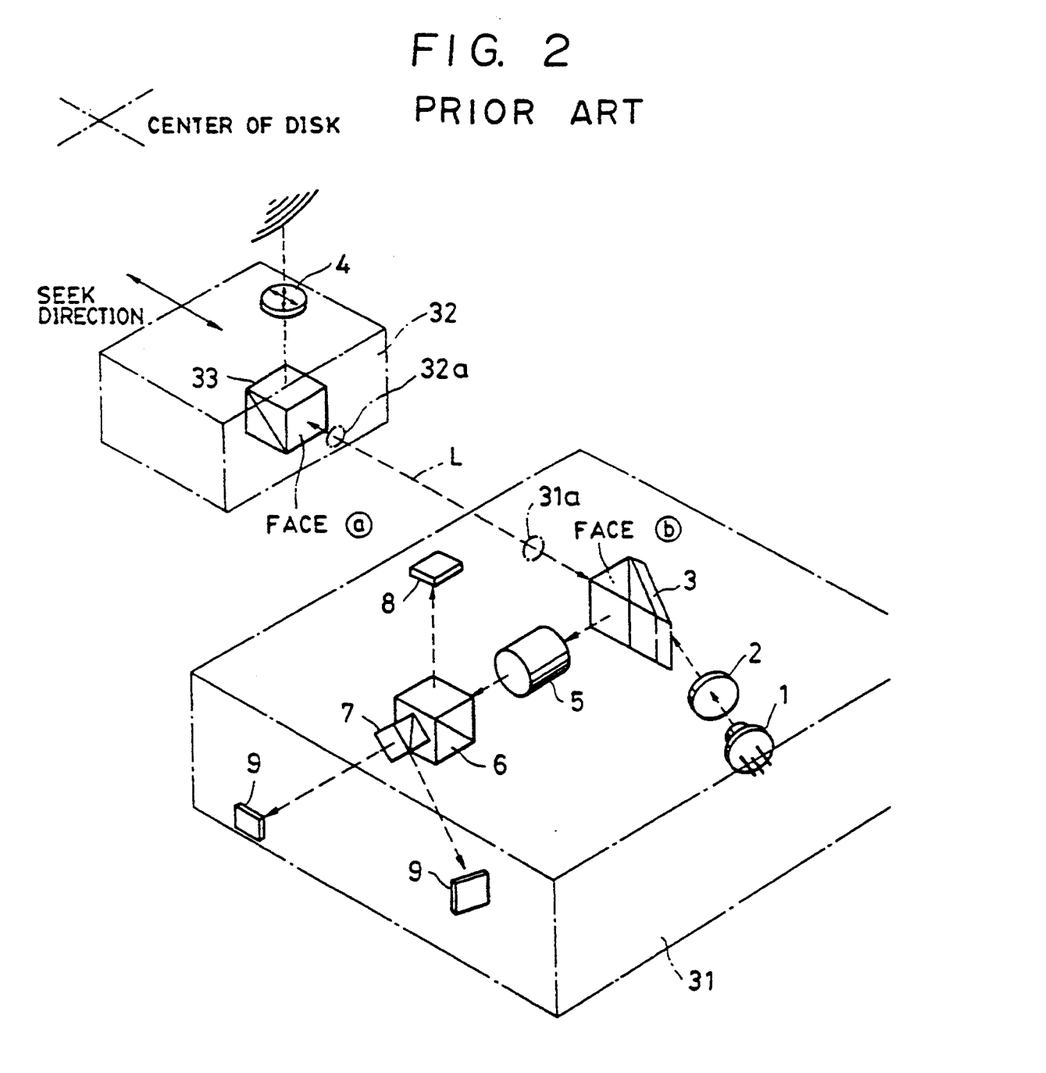
FIG. 2 is a view showing the composition of a conventional separate-type optical head.

In this kind of information recording and reproducing apparatus, an optical head provided with a series of optical systems is used to record, reproduce or erase audio or visual information by using a light beam with high performance characteristics and operating to record, reproduce, or erase a random portion of the disk. For example, as shown in FIG. 1, the optical head is composed of optical elements, such as a semiconductor laser 1, a collimator lens 2, polarization beam splitters (PBSs) 3, 6 and 7, an objective lens 4, a condenser lens 5, a servo sensor 8, an RF sensor 9 and the like, which elements are mounted in a head block. Recently developed head blocks have been made light in order to shorten the seek time. In these head blocks, the optical head is divided into a fixed head unit 31 and a movable head unit 32 movable for seeking as shown in FIG. 2. In this case, the movable head unit 32 is provided with an objective lens 4 and a reflecting mirror 33. The objective lens 4 is supported by an unillustrated bobbin and is capable of being moved by an actuator (not shown) mounted at the movable head unit 32 in the focusing direction and in the tracking direction.

The fixed head unit 31 is provided with optical elements, such as a semiconductor laster 1, a collimator lens 2, polarization beam splitters 3, 6 and 7, a condenser lens 5, a servo sensor 8, an RF sensor 9 and so on.

An optical path L extends in a direction parallel with the seek direction between the fixed head unit 31 and the movable head unit 32, and optical path windows 31a and 32a corresponding to and positioned in the optical path L are disposed in the fixed head unit 31 and the movable head unit 32, respectively.

However, the conventional optical head having the above-mentioned composition has the following problems.

1. It is likely that dust, which intrudes into the blocks of the head units 31 and 32 through the optical path windows 31a and 32a, will stick and accumulate onto the face "b" of the polarization beam splitter 3 corresponding to the optical path window 31a and the face "a" of the reflecting mirror 33 mounted in the movable head unit 32 corresponding to the optical path window 32a. If the dust thus sticks and accumulates onto the polarization beam splitter 3 and the reflecting mirror 33, the effective value of the laser power is decreased, the light signal is influenced and the reliability of the servo signal is lowered.

2. Since the bobbin of the actuator for supporting the objective lens 4 is moved in the direction of the optical axis of the objective lens 4 in controlling the focusing direction, the objective lens 4 approaches and retreats from the optical head block (carriage) of the movable head unit 32. Therefore, when the objective lens 4 is far from the optical head block, dust is likely to intrude into the optical head block from above the reflecting mirror 33, and then stick and accumulate onto the reflecting mirror 33. If dust thus sticks and accumulates onto the reflecting mirror 33, the effective value of the laser power is decreased, the light signal is influenced, and the reliability of the servo signal is lowered.

SUMMARY OF THE INVENTION

It is an object of the present invention to provide an optical head which can decrease the intrusion of dust into the optical head, assure the effective value of the power of the laser, and maintain the reliability of a servo signal for a long period of time.

It is another object of the present invention to overcome the disadvantages of the prior art.

In order to accomplish these objectives, according to one aspect, the present invention relates to an optical head for recording, reproducing, or erasing information by projecting a light beam onto a disk-like recording medium. The optical head comprises a fixed head unit having at least a light source for generating the light beam and a sensor for receiving light reflected from the disk-like recording medium which was generated by the light source and projected to the disk-like recording medium. The optical head also includes a movable head unit movable in the radial direction of the disk-like recording medium toward the fixed head unit and having at least an objective lens for condensing the light beam generated by the light source and for projecting the light beam onto the recording medium. The fixed head unit and the movable head unit each comprise a wall having an optical path window therein positioned in the optical path between the fixed head unit and the movable head unit. Each wall also has a portion surrounding the optical path window and projecting in the direction of the optical path between the fixed head unit and the movable head unit. These wall portions can be cylindrical projections in one embodiment.

According to still another aspect, the present invention relates to an optical head having the fixed head unit and the movable head unit discussed above. However, in this embodiment the fixed head unit and the movable head unit comprise portions adapted to engage each other when the movable head unit is in a predetermined position so as to surround an optical path between the fixed head unit and the movable head unit. The predetermined position can be a home position to which the movable head unit is retracted when the movable head unit is not performing a recording, reproducing, or erasing operation. Means can be provided for performing such a retracting operation to the home position. In this embodiment, the fixed head unit and the movable head unit can each comprise a wall having an optical path window therein positioned in the optical path between the fixed head unit and the movable head unit, and a portion surrounding the optical path window and projecting in the direction of the optical path between the fixed head unit and the movable head unit. In this embodiment, the portions surrounding the optical path windows comprise the engaging portions noted above. In addition, the wall portions can be cylindrical projections. Also, the diameter of the wall portion of the fixed head unit and the diameter of the wall portion of the movable head unit can be different so that the wall portions do not rub against each other when the engaging noted above is performed.

According to still another aspect, the present invention relates to an optical head for recording, reproducing, or erasing information by projecting a light beam onto a disk-like recording medium. The head comprises an objective lens, a bobbin for supporting the objective lens, an actuator for moving the objective lens in a predetermined direction by moving the bobbin, a base for supporting the actuator and the bobbin, and a wall disposed on the base for surrounding the optical path to the objective lens from the base in the direction of the optical axis of the objective lens. The predetermined direction can be at least one of a focusing direction and a tracking direction. In addition, the bobbin can have an opening therein and the wall portion can be fitted into the opening disposed in the bobbin for surrounding the optical path of the light beam to the objective lens from the base. The fitting state of the wall and the opening is always maintained when the bobbin is moved by the actuator. In addition, the wall and the opening can be cylindrical in shape. Also, the diameter of the opening is smaller than the diameter of the wall and the opening and the wall do not rub against each other when the bobbin is moved in a predetermined direction. Either the base or the fixed head unit can comprise a light source for generating the beam and a sensor for receiving the light reflected from the disk-like recording medium which was generated by the light source and projected onto the disk-like recording medium.

DESCRIPTION OF THE PREFERRED EMBODIMENTS

The present invention will now be described in detail with reference to the drawings.

Figure 3:
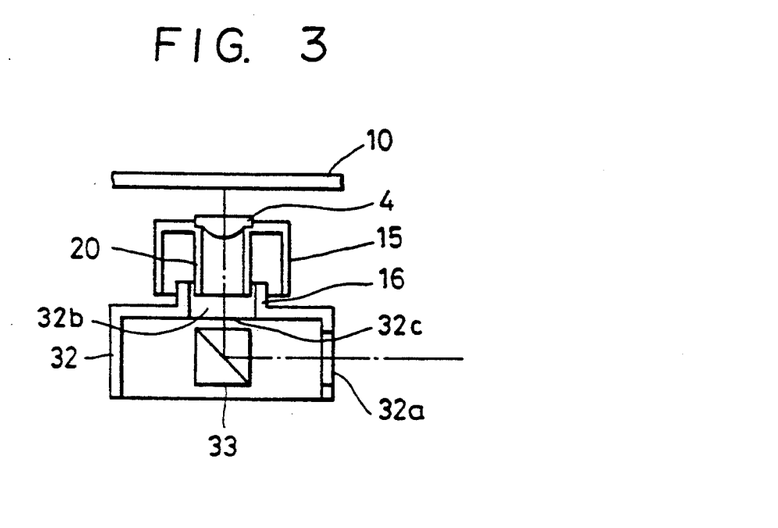
FIG. 3 is a vertical sectional view of a first embodiment of the present invention.

FIG. 3 shows the first embodiment of the present invention. The same numerals as those in the above drawings denote the same parts.

Referring to FIG. 3, numeral 32 denotes an optical head block (carriage) which constitutes a movable head unit (a fixed head unit not shown) in a separate-type optical head. The optical head block 32 is moved in the direction of the radius of a recording medium by the driving force of an unillustrated linear motor, and has a reflecting mirror 33 therein, an optical path window 32a, horizontally corresponding to and in the optical path, opened on the side thereof in a side wall thereof, and an optical path window 32b, corresponding to and in the optical path directed toward an objective lens 4, opened on an upper face or wall 32c of the optical head block above the reflecting mirror 33. The objective lens 4 is mounted on a bobbin 15 of an actuator shown in detail in FIG. 4, and a barrel portion 20 of the objective lens 4 is formed in the bobbin 15. Above the bobbin 15, a disk-like information recording medium 10 is disposed opposite to the objective lens 4.

A cylindrical portion 16 corresponding to the bobbin 15 projects on the side of the bobbin 15 at the opening 32b of the optical head block 32 so as to surround the optical path between the objective lens 4 and the reflecting mirror 33. In particular, the barrel portion 20 of the objective lens 4 is fitted into the cylindrical portion 16 with a clearance which does not damage the control of the tracking direction (does not cause any collision) in the first embodiment. This fitting state is always maintained regardless of the direction and amount of movement of the actuator bobbin 15.

Figure 4:
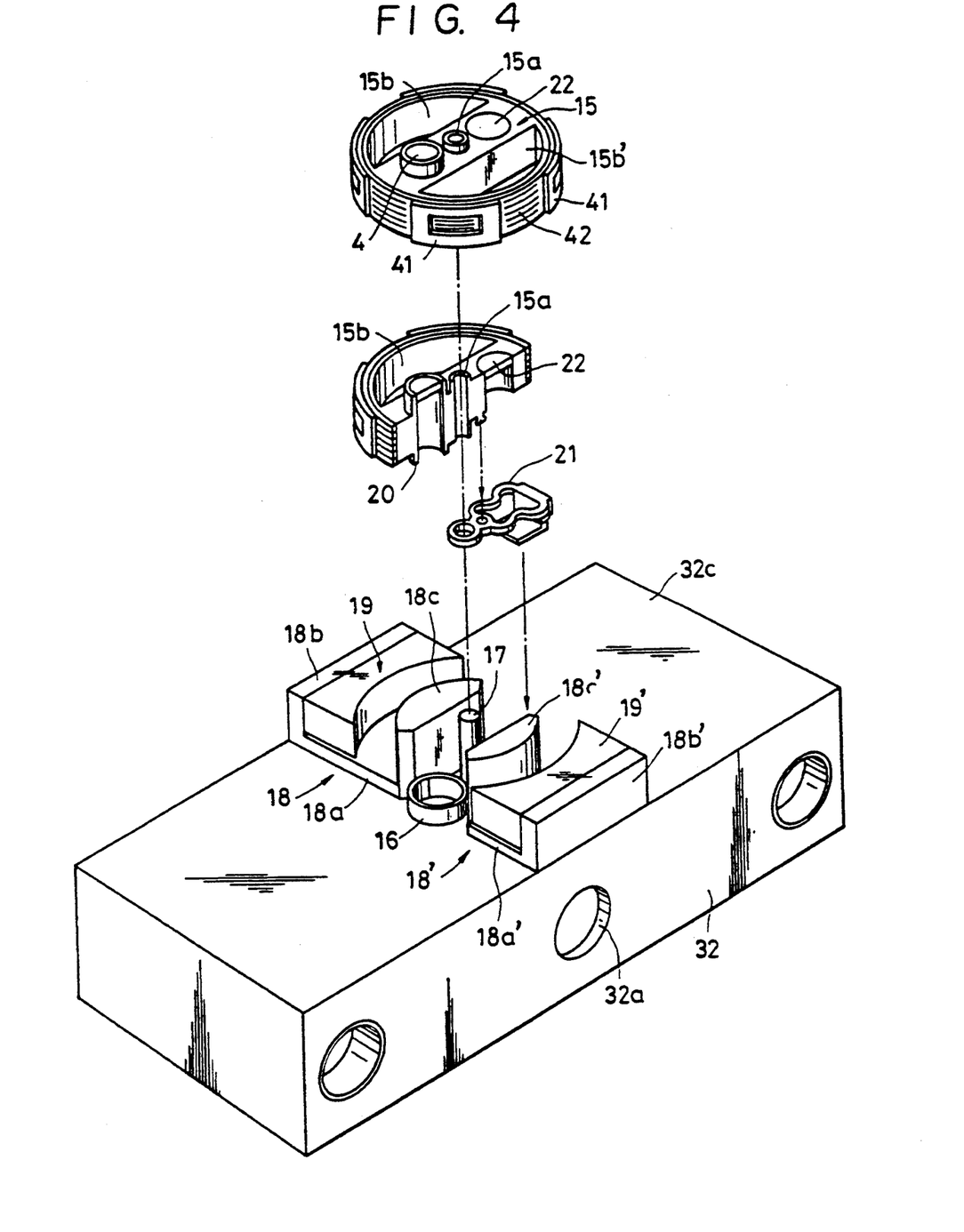
FIG. 4 is an exploded perspective view of the first embodiment of the present invention including a cutaway view of a bobbin 15.

The actuator has, as shown in FIG. 4, a shaft supporting portion 15a in the center of the bobbin 15, for being fitted onto a supporting shaft 17 projecting from the top of the optical head block 32 and supporting the bobbin 15 so that the bobbin 15 can move in the axial direction of the supporting shaft 17 (in the vertical direction with respect to the upper face 32c of the optical head block 32), and can move to rotate around the supporting shaft 17 (in the horizontal direction with respect to the upper face 32c of the optical head block 32). A weight 22 is mounted on the bobbin 15 so that the objective lens 4 and the weight 22 are disposed symmetrically with respect to the shaft 17. A focusing coil 42 is arranged around the outer periphery of the bobbin 15 and tracking coils 41 are arranged at regular intervals in the circumferential direction on the coil 42. Furthermore, a magnetic field generating means for generating a magnetic field which crosses the coil 42, is disposed on the upper face 32c of the optical head block 32. In this embodiment, a pair of electromagnetic yokes 18 and 18', having external yokes 18b and 18b' and internal yokes 18c and 18c', which are connected through bottom yokes 18a and 18a', are used as a magnetic field generating means. Mounted at the faces of the external yokes 18b and 18b' which are facing each other, are magnets 19 and 19'. The internal yokes 18c and 18c' are loosely fitted into semicircular engagement holes 15b and 15b' formed in the bobbin 15. Referring to the figure, numeral 21 denotes a control rubber member for returning the bobbin 15 to the neutral position (in the tracking direction).

Figure 5A:
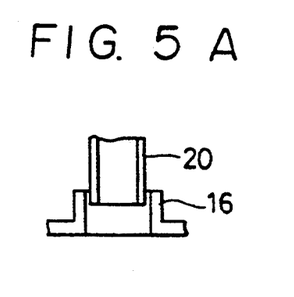
FIGS. 5A and 5B are views each showing a state where the first embodiment of the present invention is being used.
Figure 5B:
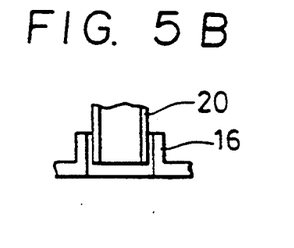

According to such an embodiment, an electromagnetic force acts on the bobbin 15 in accordance with the control of the electric current to the coils 41 and 42. When the coils 41 are energized, a clockwise or counterclockwise rotational force acts, and when the coil 42 is energized, a force in the upward or downward direction (in the focusing direction) acts on the bobbin 15, thereby moving the bobbin 15 along the supporting shaft 17. In particular, although the optical path between the objective lens 4 and the reflecting mirror 33 expands and contracts when the bobbin 15 is moved upward and downward by energizing the coil 42, dust is prevented from intruding from the sides. This is accomplished since the cylindrical portion 16 extends in the direction of the optical axis, and the barrel portion 20 of the objective lens 4 is fitted into the cylindrical portion 16 in this embodiment. Therefore, since dust does not stick and accumulate onto the reflecting mirror 33, the reflecting mirror 33 is thus kept clean. Therefore, the power of the laser is not reduced, there is no undesirable influence on the light signal, and the high reliability of the servo signal can be maintained. FIG. 5A shows the state in which the bobbin 20 has been moved to the upper limit in the focusing direction, and FIG. 5B shows the state in which the bobbin 20 is moved to the lower limit in the same direction as above. These figures reveal that the optical path is always surrounded by the cylindrical portion 16.

Figure 6:
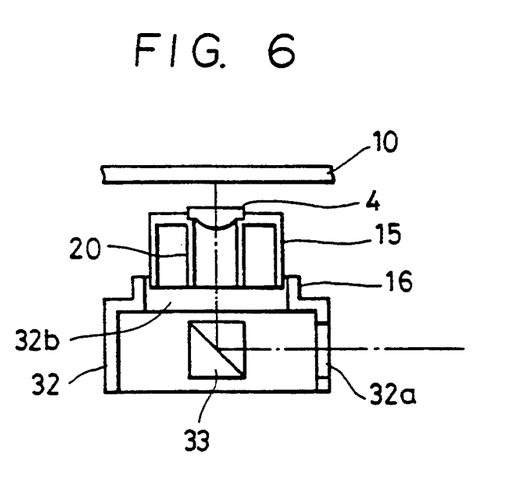
FIG. 6 is a vertical sectional view of a second embodiment of the present invention.

In the second embodiment of the present invention shown in FIG. 6, the cylindrical portion 16 is mounted so as to surround the outer periphery (or the skirt portion extending under the outer periphery) of the actuator bobbin 15. In this case, dust is also substantially prevented from intruding into the optical path between the objective lens 4 and the reflecting mirror 33. Furthermore, if the barrel portion 20 is mounted together with the objective lens 4 in the bobbin 15, since the optical path is surrounded by two different elements, it is possible to further enhance the efficiency of dust protection.

Thus, in addition to providing the cylindrical portion 16, which projects from the top of the optical head block 32 in the above embodiments, the present invention also prevents dust from intruding into the optical path by mounting a cylindrical portion, which projects toward the cylindrical portion 16, on the side of the bobbin 15. This is accomplished by utilizing the barrel portion 20 and the outer periphery of the bobbin 15.

Though the barrel portion 20 of the objective lens 4 is fitted into the cylindrical portion 16 of the optical head block 32, the cylindrical portion 16 of the optical head block 32 may be fitted into the barrel portion 20. However, in this case, it is necessary to make the diameter of the barrel portion 20 a little larger so as not to obstruct the optical path.

Furthermore, though the separate-type optical head is described above, it is natural that the present invention is applicable to a unit-type optical head.

The third embodiment of the present invention will now be described. The same numerals as those in the above drawings denote the same parts.

Figure 7:
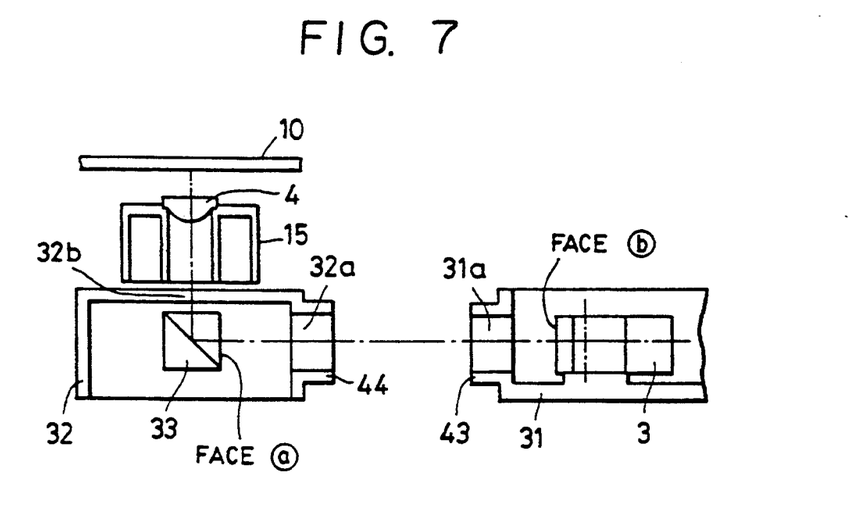
FIG. 7 is a vertical sectional view of a third embodiment of the present invention.

Referring to FIG. 7, numeral 32 denotes an optical head block (carriage) which constitutes a movable head unit (a fixed head unit not shown) in a separate-type optical head. The optical head block 32 has a reflecting mirror 33 therein, an optical path window 32a horizontally opened in a side wall of the optical head block 32 and corresponding to and in the optical path, and an optical path window 32b opened in a top wall above the reflecting mirror 33 corresponding to and in the optical path directed toward an objective lens 4. The objective lens 4 is mounted on a bobbin 15 of an actuator shown in detail in FIG. 8 and a barrel portion 20 of the objective lens 4 is formed in the bobbin 15 and faces the optical path window 32b. Above the bobbin 15, a disk-like information recording medium 10 is disposed opposite to the objective lens 4.

The horizontal optical path of the movable head unit 32 is directed in parallel with the seek direction of a disk-like recording medium 10 and the movable head unit 32 is controlled so as to approach or retreat from a fixed head unit 31 in this direction. An optical path window 31a corresponding to and in the optical path is mounted in the fixed head unit 31 and is opposite to, for example, a polarization beam splitter 3, on the inside of the fixed head unit.

Figure 8:
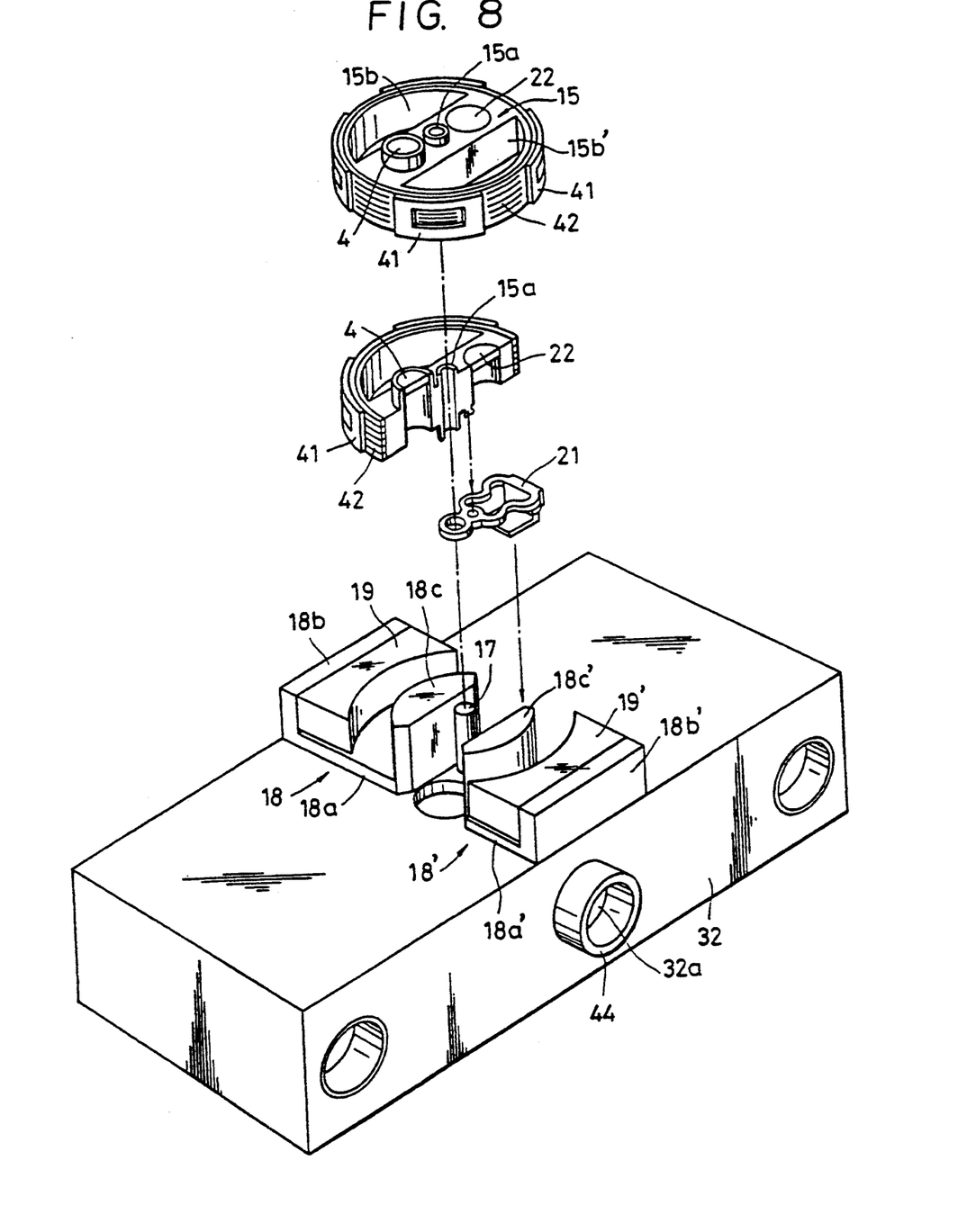
FIG. 8 is an exploded perspective view of the third embodiment of the present invention including a cutaway view of a bobbin 15.
Figure 9:
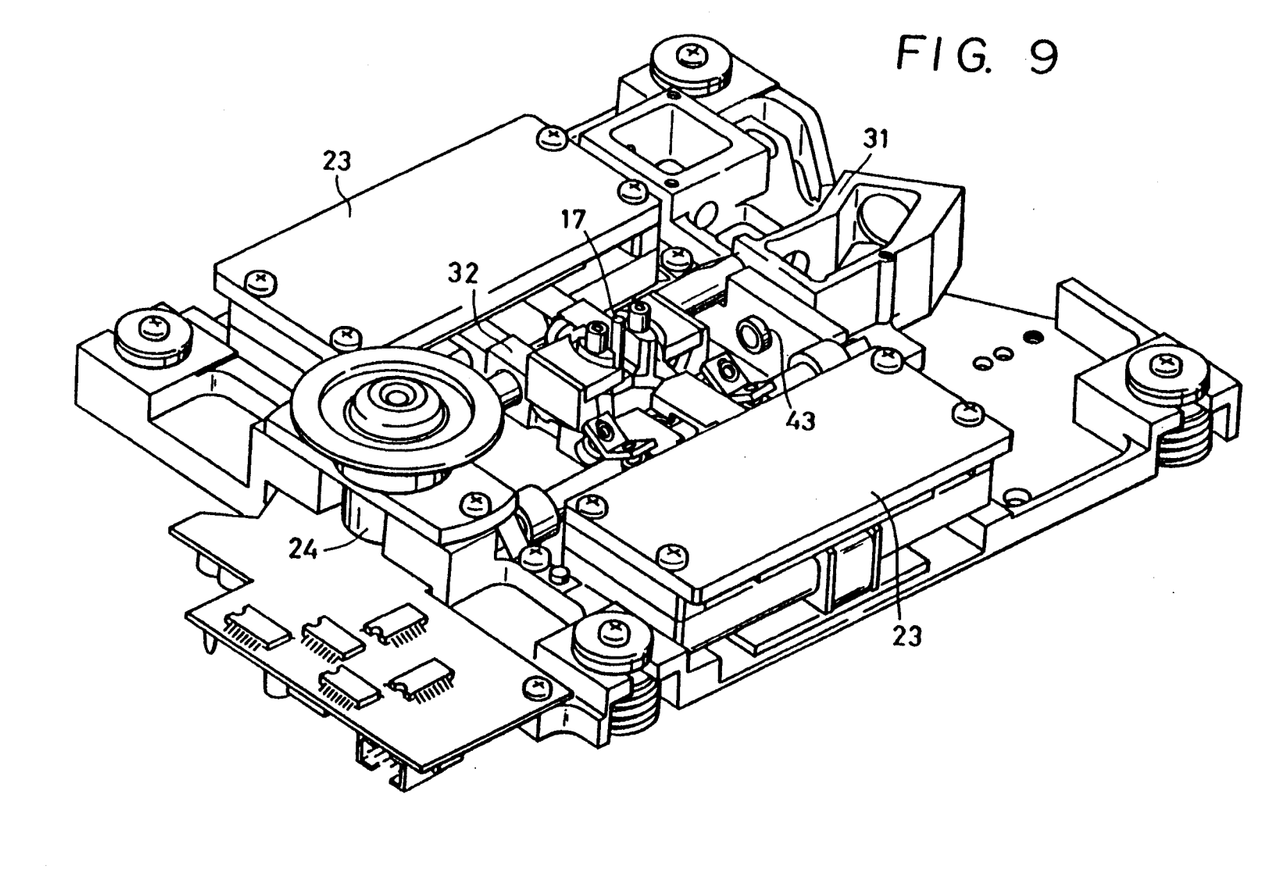
FIG. 9 is a perspective view of the whole optical head except for an actuator bobbin of an objective lens in the third embodiment of the present invention.

The actuator has, as shown in FIG. 8, a shaft supporting portion 15a in the center of the bobbin 15, adapted to fit onto a supporting shaft 17 mounted on the optical head block 32 and supporting the bobbin 15 so that the bobbin 15 can move in the axial direction of the supporting shaft 17 and can rotate around the supporting shaft 17. A weight 22 is mounted on the bobbin 15 so that the objective lens 4 and the weight 22 are disposed symmetrically with respect to the shaft 17. A focusing coil 42 is arranged around the outer periphery of the bobbin 15 and tracking coils 41 are arranged at regular intervals in the circumferential direction on the coil 42. Furthermore, a magnetic field generating means for generating a magnetic field which crosses the coils 41 and 42, is disposed on the upper face 32c of the optical head block 32. In this embodiment, a pair of electromagnetic yokes 18 and 18′, having external yokes 18b and 18b′ and internal yokes 18c and 18c′ which are connected through bottom yokes 18a and 18a′, are used as a magnetic field generating means. Mounted at the faces of the external yokes 18b and 18b′ which are facing each other are magnets 19 and 19′. The internal yokes 18c and 18c′ are loosely fitted into semicircular engagement holes 15b and 15b′ formed in the bobbin 15. Referring to the figure, numeral 21 denotes a control rubber member for returning the bobbin 15 to the neutral position (in the tracking direction). FIG. 9 is a perspective view of the entire optical head of the third embodiment. Numeral 23 denotes a linear motor and numeral 24 denotes a spindle motor.

Furthermore, in the present invention, cylindrical dustproof members 43 and 44 projecting outward are mounted at the optical path windows 31a and 32a.

According to such an embodiment, the optical head block 32 is moved by the linear motor 23 in a seek operation so as to approach or retreat from the fixed head unit 31. At this time, a flow of air is generated in the seek direction. After the seeking operation, an electromagnetic force acts on the bobbin 15 in accordance with the control of the electric current to the coils 41 and 42. When the coils 41 are energized, the clockwise or counterclockwise rotational force acts, and when the coil 42 is energized, a force in the upward or downward direction (in the focusing direction) acts on the bobbin 15, thereby moving the bobbin 15 along the supporting shaft 17.

In this case, since the above-mentioned dustproof members 43 and 44 are mounted in the present invention, even if air flow in the seek direction is caused by the movement of the movable head unit 32, dust is prevented from intruding into the movable head unit 32 and the fixed head unit 31 as much as possible. Therefore, sticking and accumulation of dust onto the internal optical element, the face "a" of the reflecting mirror 33 and the face "b" of the polarization beam splitter 3 (shown in FIG. 7) in this embodiment, are prevented for a long time and the faces "a" and "b" are kept clean. As a result, it is possible to reduce undesirable influences on the light signal and maintain a high reliability of the servo signal without reducing the effective value of the laser power.

The fourth embodiment of the present invention will now be described below together with reference to FIGS. 10 and 11.

In the fourth embodiment, the movable unit can be retracted to a predetermined home position during a non-operation time when the optical head is not performing a recording, reproducing or erasing operation. The non-operation time is longer than the operation time in the use state of the optical head. Dust is prevented from intruding into the optical path windows of the movable head unit and the fixed head unit by fitting the movable head unit and the fixed head unit with means so as to cover the optical path between the two head units when the movable head unit is set in the home position.

Figure 10:
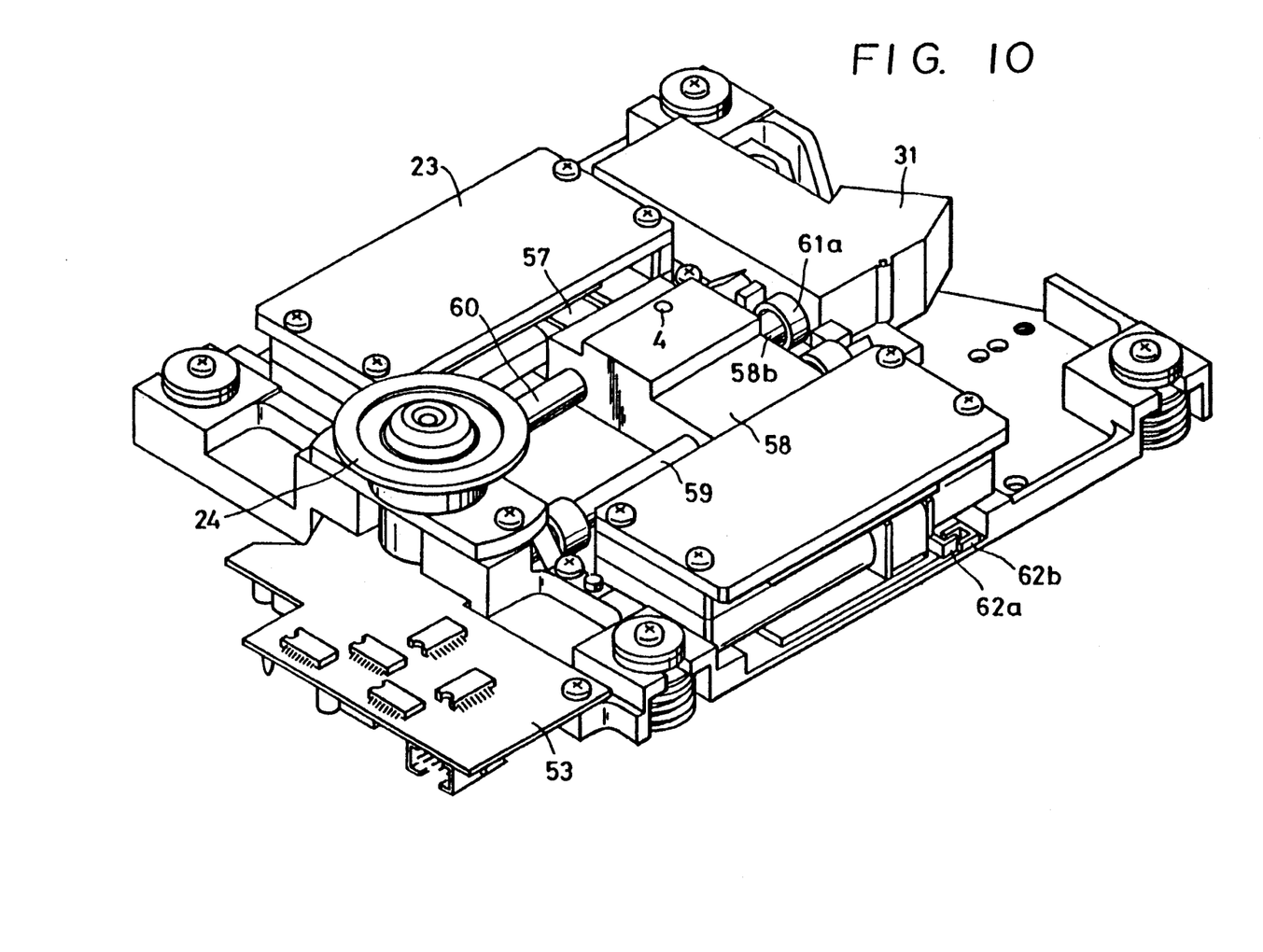
FIGS. 10 and 11 are views each showing a state where a fourth embodiment of the present invention is being used.
Figure 11:
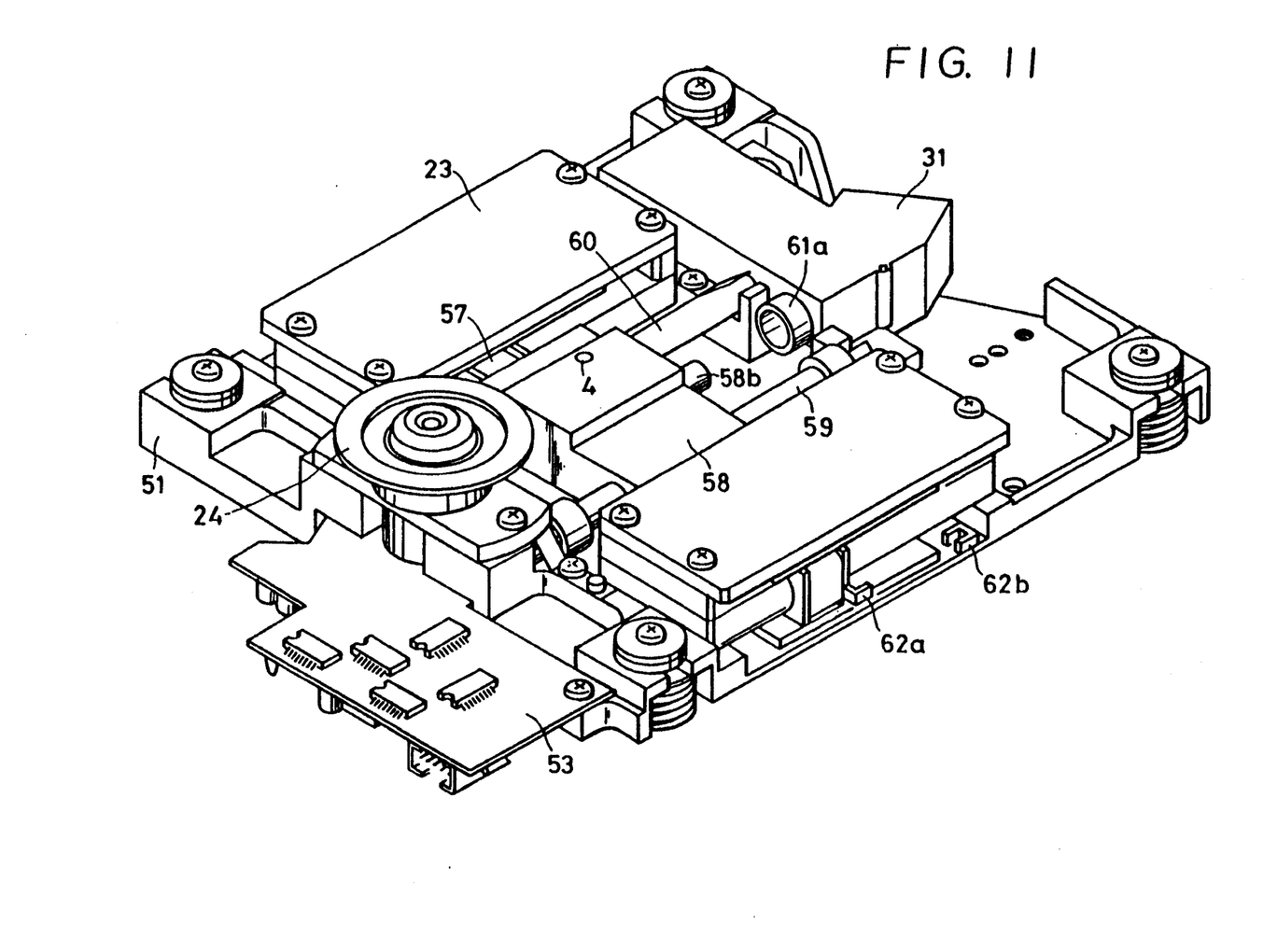

FIG. 10 shows the state in which the movable head unit is retracted to the home position and FIG. 11 shows the state in which the movable head unit has been moved toward the inner periphery of the disk for recording, reproducing, and so on. Reference numerals in FIGS. 10 and 11 which are the same as in the above drawings denote the same parts.

Referring to the figures, numeral 53 denotes a servo circuit for a spindle motor, and numeral 57 denotes a coil portion which is a part of the structure of linear motor 23 and fixed to a movable head unit 58. The movable head unit 58 comprises an objective lens 4, and objective lens actuator (not shown), an optical head block, and so on. Numerals 59 and 60 denote guide shafts for guiding the movable head unit 58 in the radial direction of the disk, and numeral 58b denotes a cylindrical projection which surrounds the optical path of the laser and which is fitted into a cylindrical projection 61a of a fixed head unit, described below, in the home position, the cylindrical portion 61a being mounted at an opening of the movable head unit 58 for transmitting and receiving the laser beam to and from the fixed head unit of the movable head unit 58 therethrough.

Numeral 31 denotes a fixed head unit. The cylindrical projection 61a is mounted in the optical path to the movable head unit 58, that is, around an opening in the movable head unit 58 for transmitting and receiving the laser beam, so as to surround the optical path. Photointerrupters 62a and 62b detect whether or not the movable head unit 58 has reached the home position when an unillustrated control circuit detects that the non-operation time has started and actuates the apparatus to move the movable head unit 58 to return it to the home position. The control circuit stops the movement of the movable head unit 58 in response to the detection by the photointerrupters 62a and 62b, so that the projection 58b is prevented from colliding with the fixed head unit 31 and optical elements in the fixed head unit 31, and the projection 61a is prevented from colliding with the movable head unit 58 when the projection 58b is fitted into the projection 61a. The projections 58b and 61a may be cylindrical, and may have any shape that can seal the optical path by fitting into each other without obstructing the optical path. Furthermore, it is preferable to design the diameter and length of the cylindrical projections so that the projections do not rub against each other and do not damage other optical elements when they are fitted in the home position.

In the fourth embodiment, even when the movable head unit 58 is not in the home position, the intrusion of dust can be prevented by the projections 58b and 61a as described in the third embodiment.

The unillustrated linear motor and control circuit are well known in the optical recording and reproducing art and their specific construction and operation is not critical to the operation or best mode for carrying out the invention.

We claim:

1. An optical head for recording, reproducing, or erasing information by projecting a light beam onto a disk-like recording medium, comprising:
   a fixed head unit having at least a light source for generating the light beam and a sensor for receiving light reflected from the disk-like recording medium which was generated by said light source and projected onto the disk-like recording medium;
   a movable head unit movable in the radial direction of the disk-like recording medium toward said fixed head unit and having at least an objective lens for condensing the light beam generated by said light source and for projecting the light beam onto the disk-like recording medium;
   wherein said fixed head unit and said movable head unit each comprise a wall having:
   an optical path window therein positioned in the optical path between said fixed head unit and said movable head unit; and
   a portion of said wall surrounding the optical path window and projecting in the direction of the optical path between said fixed head unit and said movable head unit, and
   wherein said portion of said fixed head unit and said portion of said movable head unit which surround said optical path window are so shaped that they engage each other when said movable head unit is in a predetermined position but do not engage each other when said movable head unit is not in said predetermined position.

2. An optical head as recited in claim 1, wherein said each portion is a cylindrical projection.

3. An optical head for recording, reproducing, or erasing information by projecting a light beam onto a disk-like recording medium, comprising:
   a fixed head unit having at least a light source for generating the light beam and a sensor for receiving light reflected from the disk-like recording medium which was generated by said light source and projected onto the disk-like recording medium;
   a movable head unit movable in the radial direction of the disk-like recording medium toward said fixed head unit and having at least an objective lens for condensing the light beam received from said fixed head unit and generated by said light source and for projecting the light beam onto the disk-like recording medium;
   wherein a portion of said fixed head unit and a portion of said movable head unit are adapted to engage each other so as to surround an optical path between said fixed head unit and said movable head unit when said movable head unit is in a predetermined position but do not engage each other when said movable head unit is not in said predetermined position.

4. An optical head as recited in claim 3, wherein said predetermined position is a home position to which said movable head unit is retracted when said movable head unit is not performing a recording, reproducing, or erasing operation.

5. An optical head as recited in claim 3, wherein said fixed head unit and said movable head unit each comprise a wall having:
   an optical path window therein positioned in the optical path between said fixed head unit and said movable head unit; and
   a portion of said wall surrounding the optical path window and projecting in the direction of the optical path between said fixed head unit and said movable head unit,
   wherein said portions surrounding the optical path windows are said engaging portions.

6. An optical head as recited in claim 5, wherein said wall portions are cylindrical projections.

7. An optical head as recited in claim 6, wherein the diameter of said wall portion of said fixed head unit and the diameter of said wall portion of said movable head unit are different so that said portions do not rub against each other when said engaging is performed.

8. An optical information recording/reproducing device for performing at least each of recording and reproducing information by projecting a light beam onto a disk-like recording medium, comprising:
   a fixed head unit having at least a light source for generating the light beam and a sensor for receiving light reflected from the disk-like recording medium which was generated by said light source and projected onto the disk-like recording medium; and
   a movable head unit movable in the radial direction of the disk-like recording medium toward said fixed head unit and having at least an objective lens for condensing the light beam generated by said light source and for projecting the light beam onto the disk-like recording medium,
   wherein said fixed head unit and said movable head unit each comprise a wall having:
      an optical path window therein positioned in the optical path between said fixed head unit and said movable head unit; and
      a portion of said wall surrounding the optical path window and projecting in the direction of the optical path window between said fixed head unit and said movable head unit,
   wherein said portion of said fixed head unit and said portion of said movable head unit which surround said optical path window are so shaped that they engage each other when said movable head unit is in a predetermined position but do not engage each other when said movable head unit is not in said predetermined position.

9. An optical information recording/reproducing device for performing at least each of recording, and reproducing information by projecting a light beam onto a disk-like recording medium comprising:
   a fixed head unit having at least a light source for generating the light beam and a sensor for receiving light reflected from the disk-like recording medium which was generated by said light source and projected onto the disk-like recording medium; and
   a movable head unit movable in the radial direction of the disk-like recording medium toward said fixed head unit and having at least an objective lens for condensing the light beam received from said fixed head unit and generated by said light source and for projecting the light beam onto the disk-like recording medium,
   wherein a portion of said fixed head unit and a portion of said movable head unit are adapted to engage each other so as to surround an optical path between said fixed head unit and said movable head unit when said movable head unit is in a predetermined position but do not engage each other when said movable head unit is not in said predetermined position.

* * * * *

UNITED STATES PATENT AND TRADEMARK OFFICE
CERTIFICATE OF CORRECTION

PATENT NO. : 5,311,489
DATED : May 10, 1994
INVENTOR(S) : YASUO SUZUKI, ET AL.

It is certified that error appears in the above-indentified patent and that said Letters Patent is hereby corrected as shown below:

ON THE COVER PAGE

Item: [56] References Cited

FOREIGN PATENT DOCUMENTS

"271437 3/1990 Japan" should read -- 2-71437 3/1990 Japan --.

[57] Abstract

Line 12, "the" (last occurrence) should be deleted.
Line 13, "light beam generated by the light source and projecting" should be deleted.

COLUMN 1

Line 40, "laster" should read -- laser --.

UNITED STATES PATENT AND TRADEMARK OFFICE
CERTIFICATE OF CORRECTION

PATENT NO. : 5,311,489

DATED : May 10, 1994

INVENTOR(S) : Y. SUZUKI, ET AL.

It is certified that error appears in the above-indentified patent and that said Letters Patent is hereby corrected as shown below:

<u>COLUMN 10</u>

Line 16, "recording," should read -- recording --.

Signed and Sealed this

First Day of November, 1994

Attest:

Attesting Officer

BRUCE LEHMAN

Commissioner of Patents and Trademarks